United States Patent
Stamires et al.

(10) Patent No.: US 6,555,496 B1
(45) Date of Patent: Apr. 29, 2003

(54) MICRO-CRYSTALLINE BOEHMITES CONTAINING ADDITIVES

(75) Inventors: Dennis Stamires, Newport Beach, CA (US); Paul O'Connor, Hoevelaken (NL); Gregory Pearson, Seabrook, TX (US); William Jones, Cambridge (GB)

(73) Assignee: Akzo Nobel N.V. (NL)

(*) Notice: Subject to any disclaimer, the term of this patent is extended or adjusted under 35 U.S.C. 154(b) by 0 days.

(21) Appl. No.: 09/636,688

(22) Filed: Aug. 11, 2000

Related U.S. Application Data

(63) Continuation-in-part of application No. 09/372,559, filed on Aug. 11, 1999, now abandoned.

(51) Int. Cl.⁷ .................. B01J 23/40; B01J 23/42; B01J 23/00; B01J 23/56; B01J 23/44
(52) U.S. Cl. .................. 502/327; 502/314; 502/320; 502/322; 502/323; 502/332; 502/333; 502/334; 502/335; 502/336; 502/341; 502/342; 502/346; 502/348; 502/351; 502/355; 502/414; 502/415; 502/439; 423/625; 423/628; 423/629
(58) Field of Search ............... 502/414, 439, 502/355, 415, 327, 332–336, 341, 342, 346, 348, 351, 314, 320–323; 423/625, 628, 629; 501/127

(56) References Cited

U.S. PATENT DOCUMENTS

| | | | |
|---|---|---|---|
| 3,357,791 A | 12/1967 | Napier | 23/143 |
| 4,117,105 A | 9/1978 | Hertzenberg et al. | 423/625 |
| 4,390,456 A * | 6/1983 | Sanchez et al. | 252/448 |
| 4,797,139 A | 1/1989 | Bauer | 51/293 |
| 5,194,243 A | 3/1993 | Pearson et al. | 423/625 |
| 5,718,879 A | 2/1998 | Chopin et al. | 423/628 |
| 5,972,820 A * | 10/1999 | Kharas et al. | 501/127 |
| 6,022,471 A * | 2/2000 | Wachter et al. | 208/120 |
| 6,027,706 A * | 2/2000 | Pinnavaia et al. | 423/600 |

FOREIGN PATENT DOCUMENTS

| | | | |
|---|---|---|---|
| EP | 0 130 835 A2 | 1/1985 | B01J/23/00 |
| EP | 0 597 738 A1 | 5/1994 | C04B/35/10 |

OTHER PUBLICATIONS

J. Medena, J. Catalysis, vol. 37 (1975), 91–100.
J. Wachowski, et al., Materials Chemistry, vol. 37 (1994), 29–38.
G. Yamaguchi, et al., Bull. Chem. Soc. Jap., vol. 32 (1959), 696–699.
G. Yamaguchi, et al., J. Chem. Soc. Jap., (Ind. Chem. Soc.), (1963), English Translation, 21 pages.

\* cited by examiner

Primary Examiner—Stanley S. Silverman
Assistant Examiner—Cam N. Nguyen
(74) Attorney, Agent, or Firm—Louis A. Morris

(57) ABSTRACT

A microcrystalline boehmite containing additive in a homogeneously dispersed state. Suitable additives are compounds containing elements selected from the group consisting of alkaline earth metals, alkaline metals, rare earth metals, transition metals, actinides, silicon, gallium, boron, titanium, and phosphorus. The microcrystalline boehmite according to the invention may be prepared in several ways. In general, a microcrystalline boehmite precursor and an additive are converted to a microcrystalline boehmite containing the additive in a homogeneously dispersed state. The additive does not contain zirconia or magnesia.

18 Claims, 15 Drawing Sheets

XRD of Catapal A

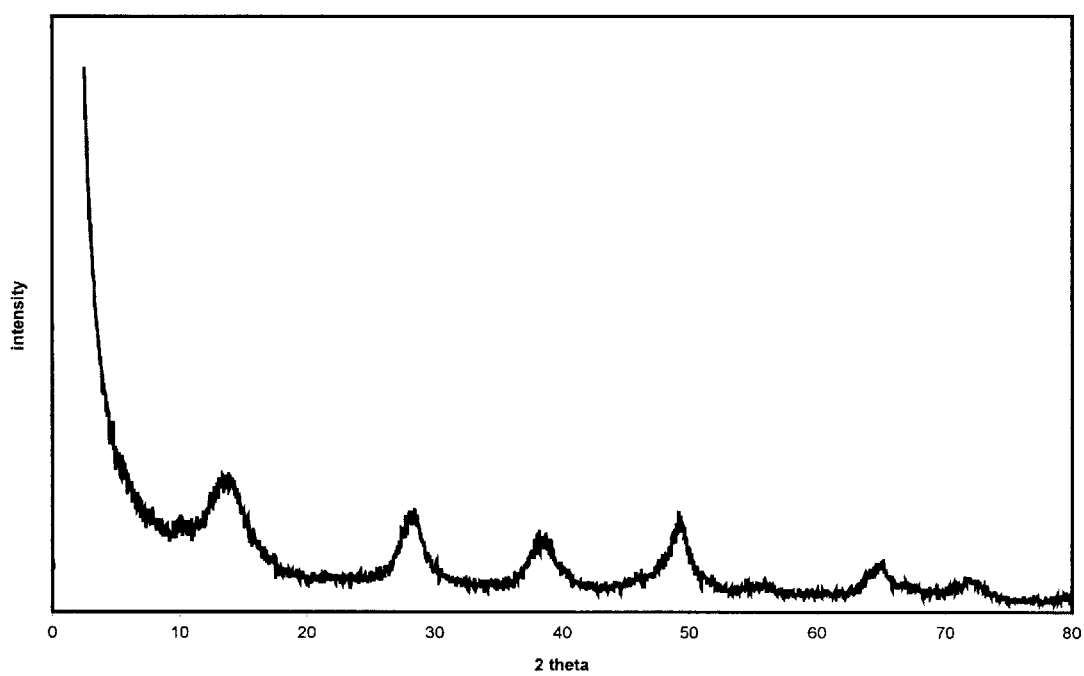
Figure 1 XRD of Catapal A

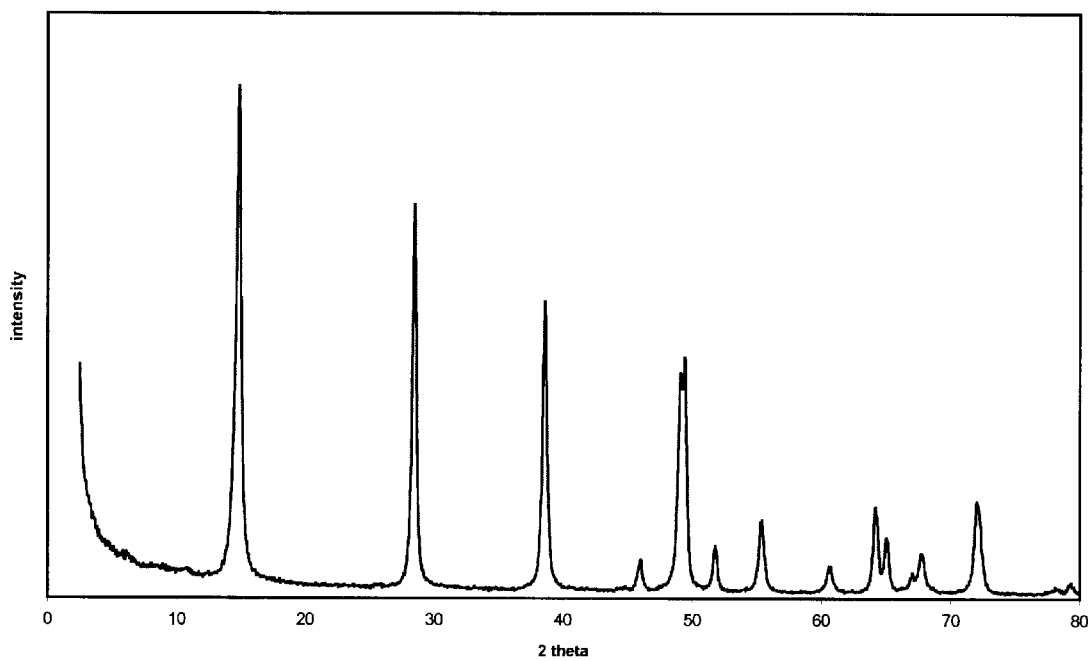
Figure 2 XRD of P200

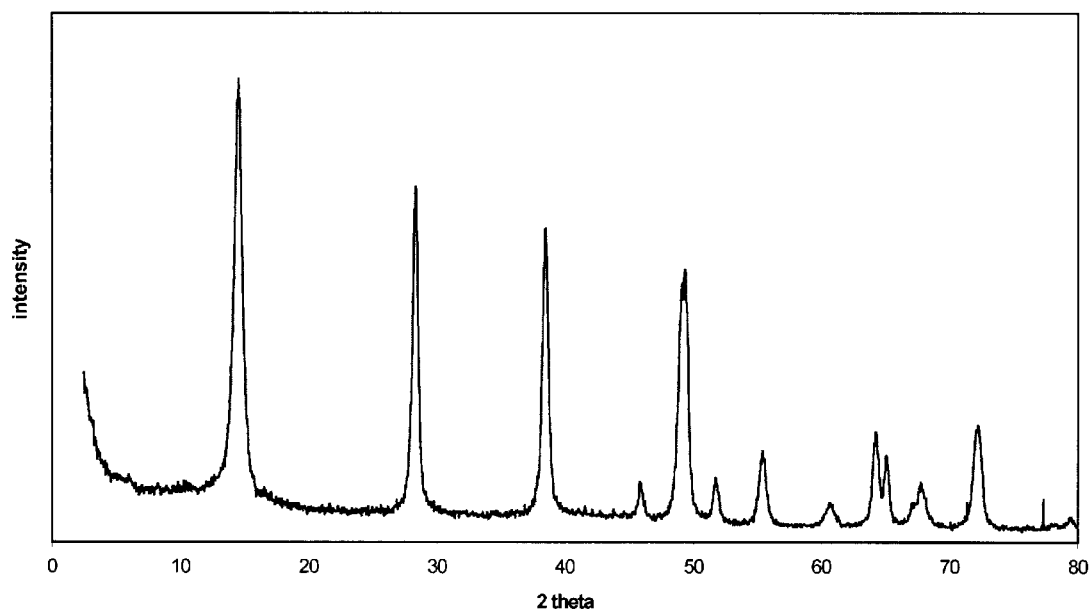
Figure 3 MCB with 5wt% La

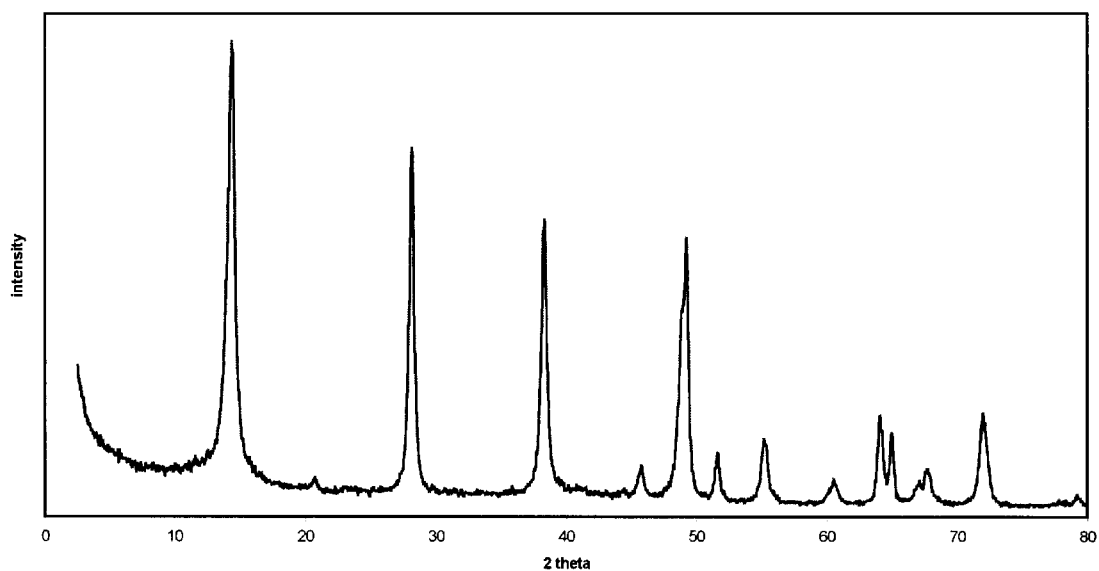
Figure 4 MCB with 5wt% La from gibbsite

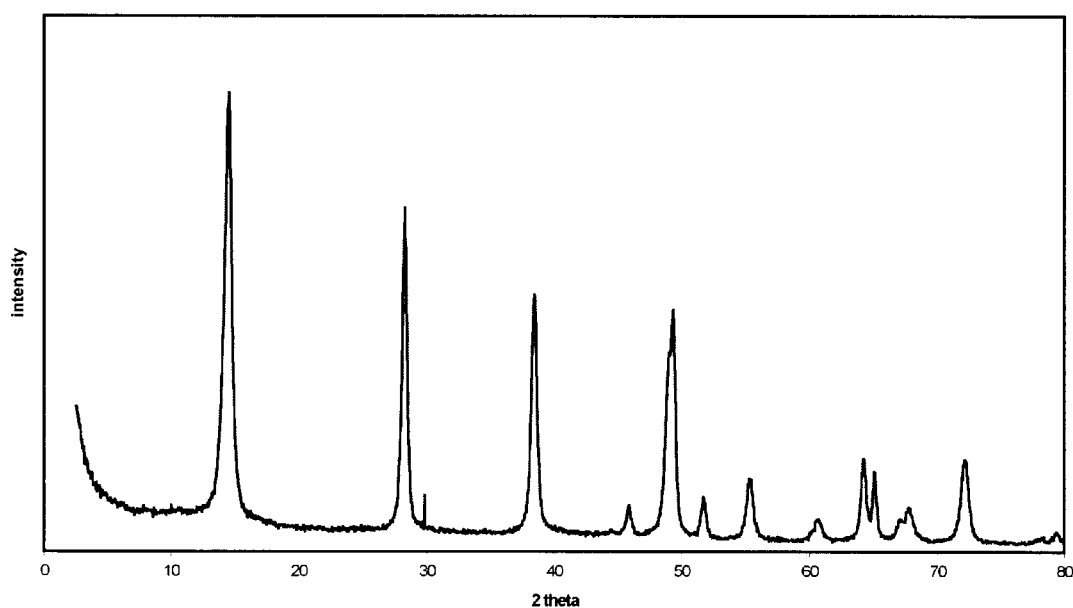
Figure 5 MCB with 5 wt% La from CP alumina

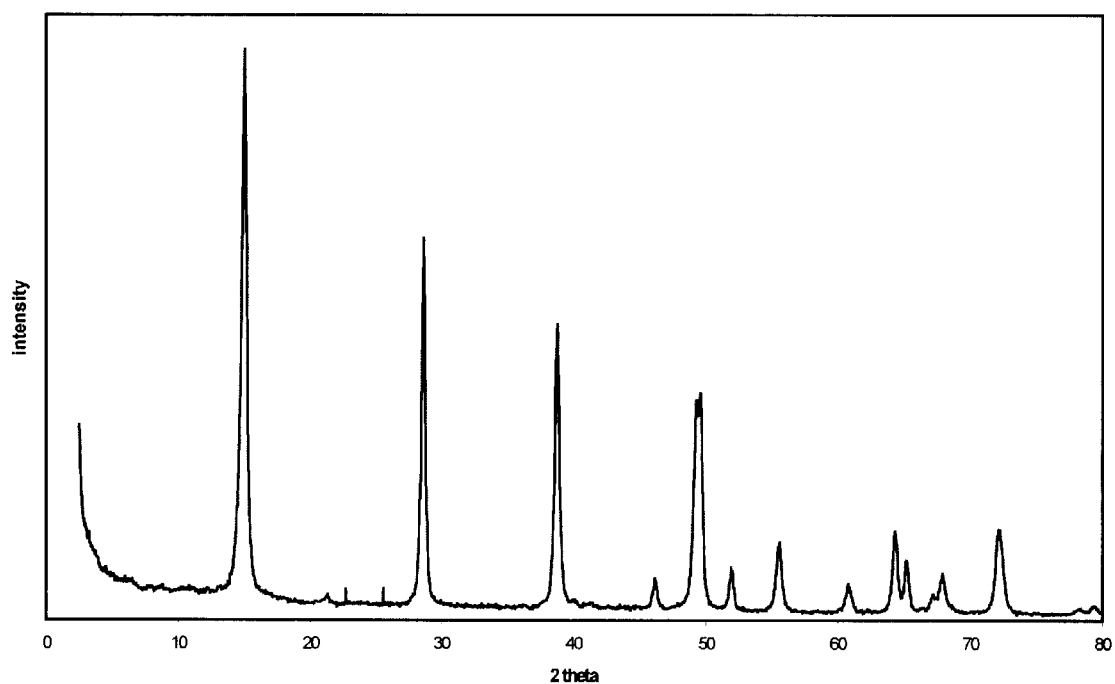
Figure 6 MCB with 5 wt% La from Bayerite

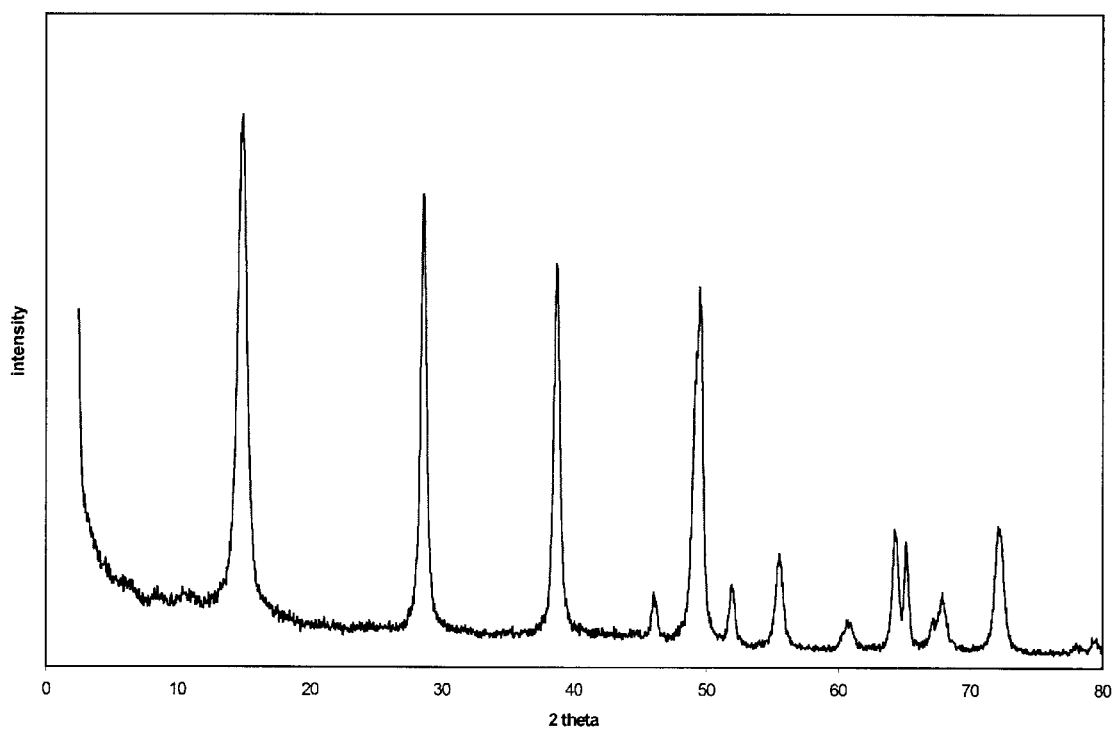
Figure 7 MCB wit 5wt% La from gibbsite and Catapal

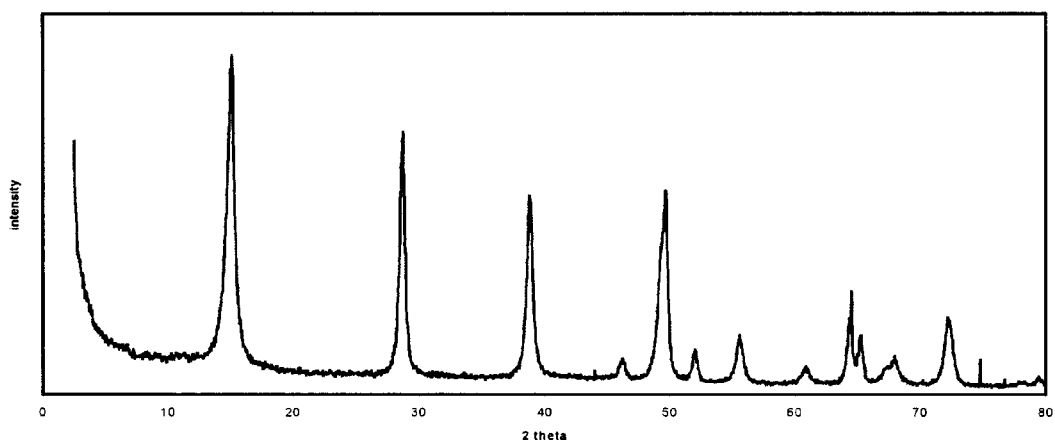
Figure 8 MCB with 5wt% La from gibbsite and CP alumina

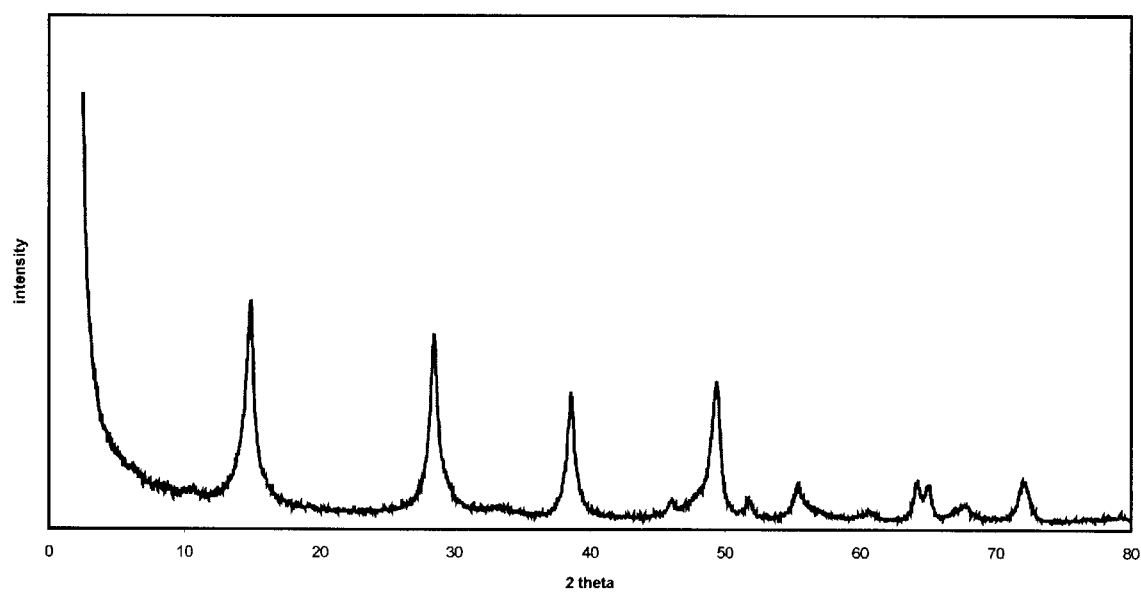
Figure 9 MCB with 5wt% Ce from CP alumina

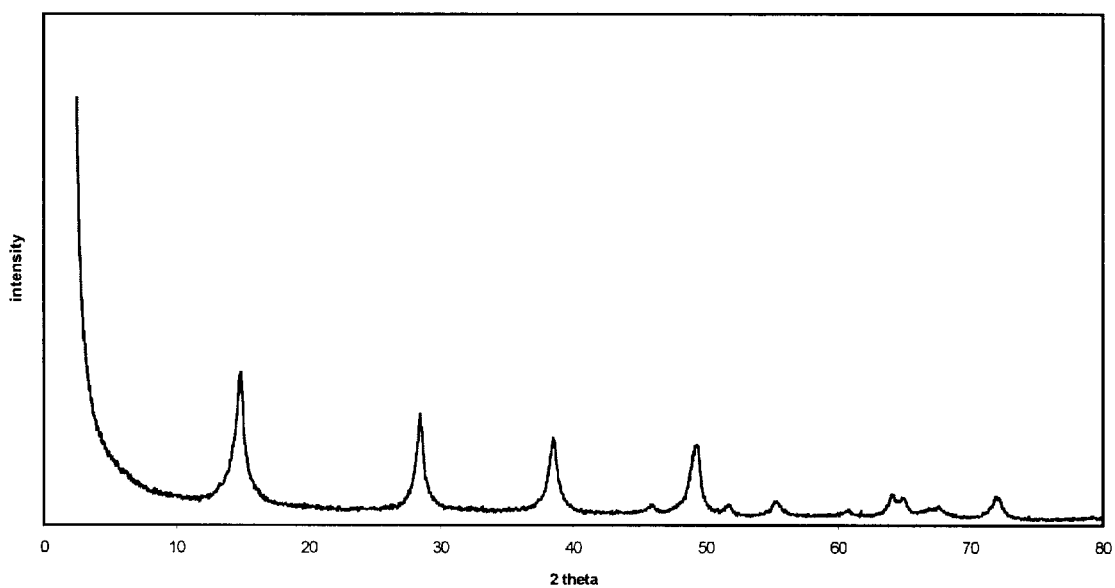
Figure 10 MCB with 5wt% Zn from CP alumina

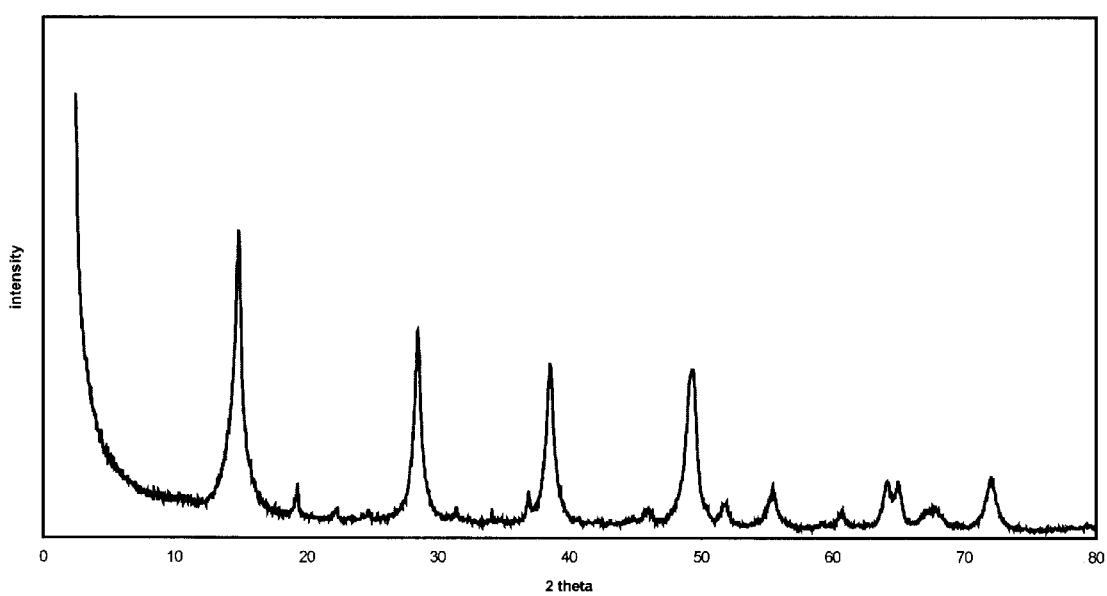
Figure 11 MCB with 5wt% Ba from CP alumina

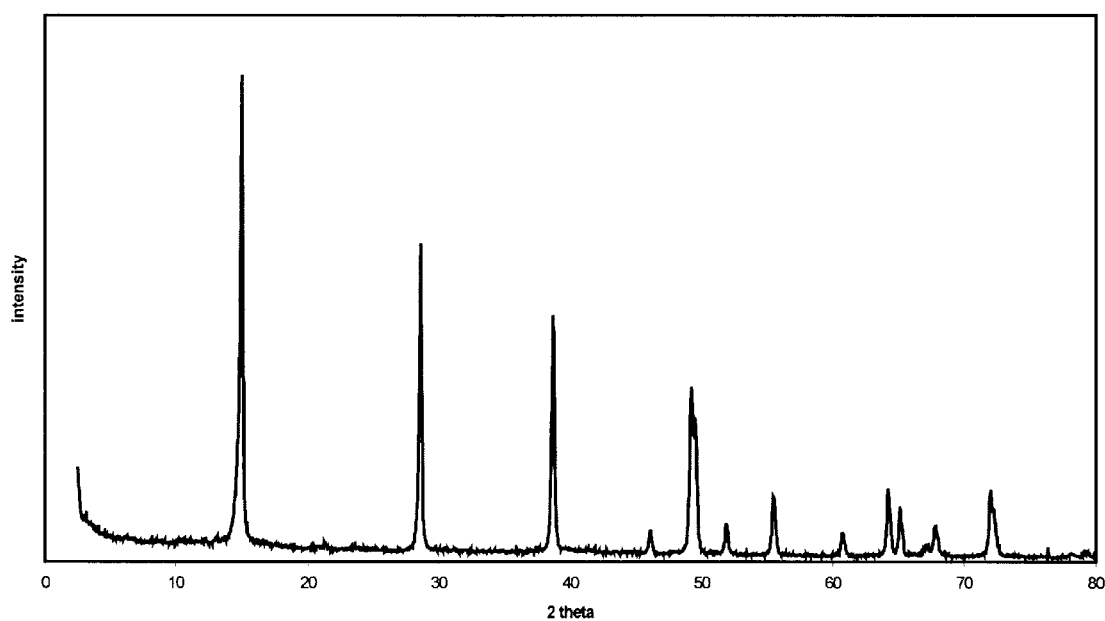
Figure 12 MCB with 5wt% La from BOC

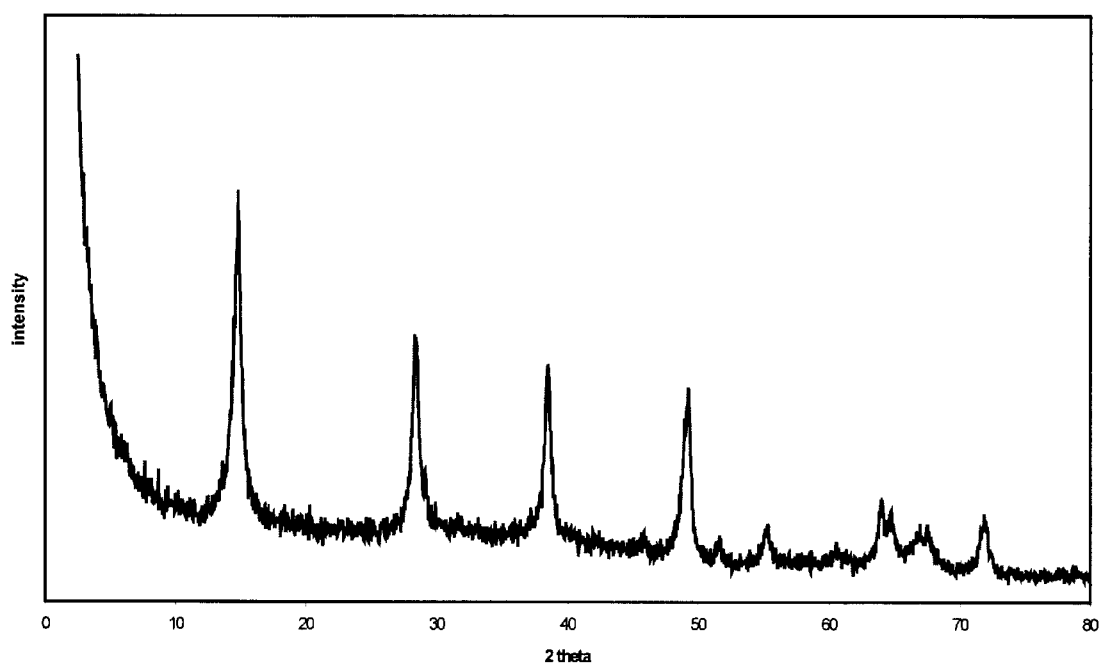
Figure 13 MCB with 10wt% Ga from CP alumina

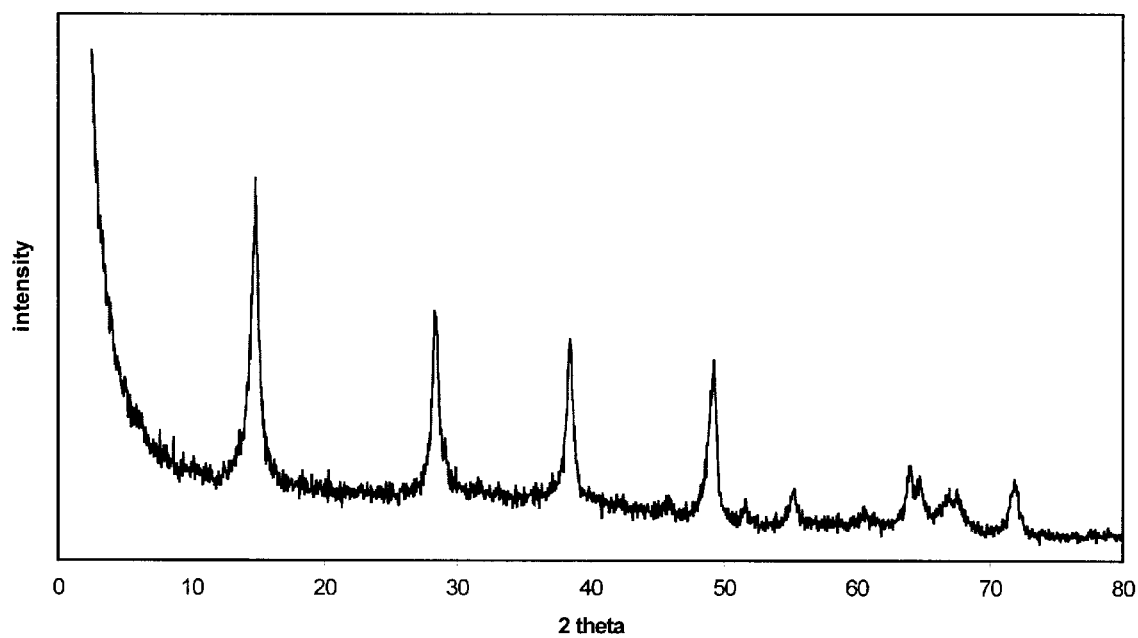
Figure 14 MCB with 5wt% Si from CP alumina

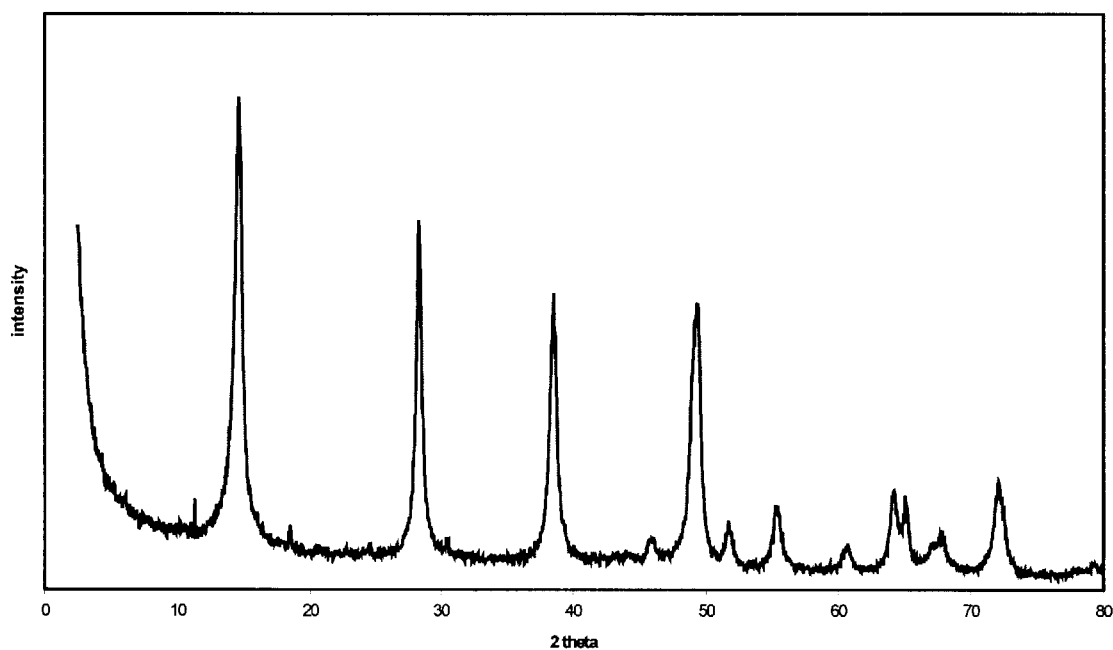
Figure 15 MCB with 5wt% La from gibbsite and CP alumina

MICRO-CRYSTALLINE BOEHMITES CONTAINING ADDITIVES

CROSS REFERENCE TO RELATED APPLICATIONS

This application is a continuation-in-part of application Ser. No. 09/372,559, filed Aug. 11, 1999, now abandoned.

BACKGROUND OF THE INVENTION

1. Field of the Invention

The present invention pertains to micro-crystalline boehmite containing additives.

2. Description of the Prior Art

Alumina, alpha-monohydrates or boehmite and their dehydrated and or sintered forms are some of the most extensively used aluminum oxide-hydroxides materials. Some of the major commercial applications, for example, ceramics, abrasive materials, fire-retardants, adsorbents, catalysts fillers in composites, and so on, involve one or more forms of these materials. Also, a substantial portion of commercial boehmite aluminas is used in catalytic applications such as refinery catalysts catalysts, catalyst for hydroprocessing hydrocarbon feeds, reforming catalysts, pollution control catalysts, cracking catalysts. The term "hydroprocessing" in this context encompasses all processes in which a hydrocarbon feed is reacted with hydrogen at elevated temperature and elevated pressure. These processes include hydrodesulphurisation, hydrodenitrogenation, hydrodemetallisation, hydrodearomatisation, hydro-isomerisation, hydrodewaxing, hydrocracking, and hydrocracking under mild pressure conditions, which is commonly referred to as mild hydrocracking. This type of alumina is also used as a catalyst for specific chemical processes such as ethylene-oxide production and methanol synthesis. Relatively more recent commercial uses of boehmite types of aluminas or modified forms thereof involve the transformation of environmentally unfriendly chemical components such as chlorofluorohydrocarbons (CFCs) and other undesirable pollutants. Boehmite alumina types are further used as catalytic material in the combustion of gas turbines for reducing nitrogen oxide.

The main reason for the successful extensive and diversified use of these materials in such variety of commercial uses is their flexibility, which enables them to be tailor-made into products with a very wide range of physical-chemical and mechanical properties.

Some of the main properties which determine the suitability of commercial applications involving gas-solid phase interactions such as catalysts and adsorbents are pore volume, pore size distribution, pore texture, specific density, surface areas, density and type of active center, basicity and acidity, crushing strength, abrasion properties, thermal and hydrothermal aging (sintering), and long-term stability.

By and large, the desired properties of the alumina product can be obtained by selecting and carefully controlling certain parameters. These usually involve: raw materials, impurities, precipitation or conversion process conditions, aging conditions and subsequent thermal treatments (calcinations/steamings), and mechanical treatments. Nevertheless, in spite of this wide and diversified range of existing know-how, this technology is still under development and presents unlimited scientific and technological challenges to both the manufacturers and the end-users for further development of such alumina-based materials.

The term boehmite is used in the industry to describe alumina hydrates which exhibit XRD patterns close to that of aluminum oxide-hydroxide [AlO(OH)], naturally occurring boehmite or diaspore. Further, the general term boehmite tends to be used to describe a wide range of alumina hydrates which contain different amounts of water of hydration, have different surface areas, pore volumes, and specific densities, and exhibit different thermal characteristics upon thermal treatment. Yet although their XRD patterns exhibit the characteristic boehmite [AlO(OH)] peaks, their widths usually vary and they can also shift location. The sharpness of the XRD peaks and their locations have been used to indicate the degree of crystallinity, crystal size, and amount of imperfections.

Broadly, there are two categories of boehmite aluminas. Category I, in general, contains boehmite which have been synthesized and/or aged at temperatures close to 100° C., most of the time under ambient atmospheric pressure. This type of boehmite is referred to as quasi-crystalline boehmite. The second category of boehmite which is the subject of the present invention consists of so-called microcrystalline boehmite.

In the state of the art, category I boehmite, i.e. quasi-crystalline boehmite, are referred to interchangeably as: pseudo-boehmite, gelatinous boehmite or quasi-crystalline boehmite (QCBs). Usually, these QCB aluminas have very high surface areas, large pores and pore volumes, and lower specific densities than microcrystalline boehmite. They disperse easily in water or acids, have smaller crystal sizes than microcrystalline boehmite, and contain a larger number of water molecules of hydration. The extent of hydration of the QCB can have a wide range of values, for example from about 1.4 up, and about 2 moles of water per mole of AlO, usually intercalated orderly or otherwise between the octahedral layers.

The DTG (differential thermographimetry) curves of the water release from the QCB materials as a function of temperature show that the major peak appears at much lower temperatures compared to that of the much more crystalline boehmite. The XRD patterns of QCBs show quite broad peaks, and their half-widths are indicative of the crystal size as well as the degree of crystal perfection.

The broadening of the widths at half-maximum intensities varies substantially and for the QCBs typically can be from about 2°–6° to 2θ. Further, as the amount of water intercalated in the QCB crystals is increased, the main (020) XRD reflection moves to lower 2 θ values corresponding to greater d-spacings. Some typical, commercially available QCB's are: Condea Pural®, Catapal® and Versal® products.

The category II boehmite consist of microcrystalline boehmite (MCBs), which are distinguished from the QCBs by their high degree of crystallinity, relatively large crystal sizes, very low surface areas, and high densities. Unlike the QCBs, the MCBs show XRD patterns with higher peak intensities and very narrow half-peak line widths. This is due to the relatively small number of intercalated water molecules, large crystal sizes, higher degree of crystallization of the bulk material, and smaller amount of crystal imperfections present. Typically, the number of intercalated molecules of water can vary from about 1 up to about 1.4 per mole of AlO. The main XRD reflection peaks (020) at half-length of maximum intensity have widths from about 1.5 down to about 0.1 degree 2-theta (2θ). For the purpose of this specification we define microcrystalline boehmites as having (020) peak widths at half-length of the maximum intensity of smaller than 1.5°. Boehmites having a 020 peak width at half-length of maximum intensity larger than 1.5 are considered quasi-crystalline boehmites.

A typical commercially available MCB product is Condea's P-200® grade of alumina. Overall, the basic, characteristic differences between the QCB and MCB types of boehmites involve variations in the following: 3-dimensional lattice order, sizes of the crystallites, amount of water intercalated between the octahedral layers, and degree of crystal imperfections.

As for the commercial preparation of these boehmite aluminas, QCBs are most commonly manufactured via processes involving:

Neutralization of aluminum salts by alkalines, acidification of aluminate salts, hydrolysis of aluminum alkoxides, reaction of aluminum metal (amalgamated) with water, and rehydration of amorphous rho-alumina obtained by calcining gibbsite. The MCB types of boehmite aluminas in general are commercially produced by hydrothermal processes using temperatures usually above 150° C. and autogeneous pressures. These processes usually involve hydrolysis of aluminum salts to form gelatinous aluminas, which are subsequently hydrothermally aged in an autoclave at elevated temperatures and pressures. This type of process is for instance described in U.S. Pat. No. 3,357,791. There are several variations on this basic process involving different starting aluminum sources, additions of acids or salts during the aging, and a wide range of process conditions.

MCBs are also prepared using hydrothermal processing of gibbsite or thermally treated forms thereof. Variations on these processes involve: addition of acids, alkaline metals, and salts during the hydrothermal treatment, as well as the use of boehmite seeds to enhance the conversion of gibbsite to MCB. These types of processes are described in Alcoa's U.S. Pat. No. 5,194,243 and in U.S. Pat. No. 4,117,105.

U.S. Pat. No. 4,797,139 describes the hydrothermal processing of aluminum trihydrate and MCB as a seed to form MCB, which can act as a precursor for alpha-alumina ceramic bodies. In order to enhance the conversion of said MCB in alpha-alumina zirconia or zirconium oxide precursor and/or magnesium oxide precursor may be added prior to the reaction in the autoclave Nevertheless, whether pseudo-, quasi- or microcrystalline, such boehmite materials are characterized by reflections in their powder X-ray. The ICDD contains entries for boehmite and confirms that there would be reflections corresponding to the (020), (021), and (041) planes. For copper radiation, such reflections would appear at 14, 28, and 38 degrees 2-theta. The various forms of boehmite would be distinguished by the relative intensity and width of the reflections. Various authors have considered the exact position of the reflections in terms of the extent of crystallinity. Nevertheless, lines close to the above positions would be indicative of the presence of one or more types of boehmite phases.

In the prior art, we find QCBs containing metal ions which have been prepared by hydrolysis of alumina isopropoxide with co-precipitation of lanthanides, as described in the paper by J. Medena, *J. Catalysis*, Vol. 37 (1975), 91–100, and J. Wachowski et al., *Materials Chemistry*, Vol. 37 (1994), 29–38. The products are pseudo-boehmite type aluminas with the occlusion of one or more lanthanide metal ions. These materials have been used primarily in high-temperature commercial applications where the presence of such lanthanide metal ions in the pseudo-boehmite structure retards the transformation of the gamma-alumina to the alpha-alumina phase. Therefore, a stabilization of the gamma phase is obtained, i.e. a higher surface area is maintained before conversion to the refractory lower surface area alpha-alumina. Specifically, Wachowski et al. used the lanthanide ions (La, Ce, Pr, Nd, Sm) in quantities from 1% to 10% by weight, calcined at temperatures in the range of 500° C. to 1200° C. No information is provided by Wachowski et al. regarding the state and properties of the materials below 500° C., which is the most important area for catalytic applications.

Also, EP-A1-0 597 738 describes the thermal stabilization of alumina by the addition of lanthanum, optionally combined with neodymium. This material is prepared by aging flash-calcined Gibbsite in a slurry with a lanthanum salt at a temperature between 70 and 110° C., followed by a thermal treatment at a temperature between 100 and 1000° C. The intermediate product, prior to thermal treatment is a QCB.

The final products, like the products produced by Wachowski et al., all are high-temperature refractory (ceramic) materials which because of their bulk structures of extremely high density, very low surface areas, and small pores find very limited application in heterogeneous catalysis, especially for catalysts used in hydrocarbon conversion or modification, for example FCC and hydroprocessing commercial applications.

Further, EP-A-0 130 835 describes a catalyst comprising a catalytically active metal supported on a lanthanum or neodymium-β-$Al_2O_3$ carrier. Said carrier is obtained by the precipitation of aluminum nitrate solution with ammonium hydroxide in the presence of a lanthanum, praseodymium or neodymium salt solution. As the precipitated amorphous material is directly washed with water and filtered, the alumina is not allowed to age with time under the usual conditions and a certain pH, concentration, and temperature, so that it crystallizes to a boehmite alumina structure.

SUMMARY OF THE INVENTION

In one embodiment, the present invention is directed to microcrystalline boehmite wherein an additive which improves the MCB's suitability for use in catalytic or absorbent material is present in a homogeneously dispersed state.

In a second embodiment, the present invention is directed to transition alumina wherein additives which improve the transition alumina's suitability for use in catalytic or absorbent material are present in a homogeneously dispersed state, said additives being compounds containing elements selected from the group of alkaline earth metals, rare earth metals, transition metals, actinides, silicon, boron, titanium, and phosphorus Other objectives and embodiments of our invention encompass details about compositions, manufacturing steps, etc., all of which are hereinafter disclosed in the following discussion of each of the facets of the present invention.

BRIEF DESCRIPTION OF THE DRAWINGS

FIG. 1 is an X-ray diffractogram (XRD) for the spectrum of Catapal A® of Vista Chemicals.

FIG. 2 is an XRD for the spectrum of P200® of Condea.

FIG. 3 is the XRD pattern of the MCB formed in the procedure of Example 3.

FIG. 4 is the XRD pattern of the MCB formed in the procedure of Example 4.

FIG. 5 is the XRD pattern of the MCB formed in the procedure of Example 6.

FIG. 6 is the XRD pattern of the MCB formed in the procedure of Example 8.

FIG. 7 is the XRD pattern of the MCB formed in the procedure of Example 9.

FIG. 8 is the XRD pattern of the MCB formed in the procedure of Example 12.

FIG. 9 is the XRD pattern of the MCB formed in the procedure of Example 14.

FIG. 10 is the XRD pattern of the MCB formed in the procedure of Example 15.

FIG. 11 is the XRD pattern of the MCB formed in the procedure of Example 16.

FIG. 12 is the XRD pattern of the MCB formed in the procedure of Example 17.

FIG. 13 is the XRD pattern of the MCB formed in the procedure of Example 18.

FIG. 14 is the XRD pattern of the MCB formed in the procedure of Example 19.

FIG. 15 is the XRD pattern of the MCB formed in the procedure of Example 20.

DETAILED DESCRIPTION OF THE INVENTION

In the prior art QCBs containing homogeneously dispersed additives are known, e.g. the lanthanide containing intermediate product of the process described in Wachowski. Said additives retard the conversion of gamma-alumina to alpha-alumina which has a very low surface area and is therefore useless as a catalytic or absorbent material. It was found that MCBs containing said lanthanides in a homogeneously dispersed state have an improved thermal stability over QCBs containing lanthanides. As mentioned-above, microcrystalline boehmites with their high crystallinity, specific surface area etc., may be used for specific applications in the catalyst field or absorbent field.

The additive present in the MCB according to the invention helps to adjust the MCB's physical, chemical, and catalytic properties such as specific density, surface area, thermal stability, pore size distribution, pore volume, density and type of active centers, basicity and acidity, crushing strength, abrasion properties, etc., which determine the boehmite's suitability for use in catalytic or absorbent material. As will be clear from the above, additives which enhance the formation of alpha-alumina such as zirconia and magnesia are not considered additives which improve the MCBs suitability for catalytic and absorbent material and are therefore not part of the invention. The fact that the additive is homogeneously dispersed within the MCB distinguishes the MCBs according to the invention from MCBs which have been impregnated with additives, and renders these new MCBs extremely suitable for catalytic purposes or as starting materials for the preparation of catalysts for heterogeneous catalytic reactions. It is easy to determine that an additive is not homogeneously dispersed in the microcrystalline alumina, because in that case the additive is present as a separate phase and is detectable in the X-ray diffraction pattern. It is, of course, possible to incorporate different types of additives into the MCB according to the invention.

Suitable additives are compounds containing elements selected from the group of alkaline earth metals, rare earth metals, alkaline metals, transition metals, actinides, noble metals such as Pd and Pt, silicon, gallium, boron, titanium, and phosphorus. For instance, the presence of silicon increases the amount of acidic sites in the boehmite, transition metals introduce catalytic or absorbing activity such as $SO_x$ captivation, $NO_x$ captivation, hydrogenation, hydroconversion, and other catalytic systems for gas/solid interactions.

Suitable compounds containing the desired elements are nitrates, sulphates, chlorides, formates, acetates, carbonates, vanadates, etc. The use of compounds with decomposable anions is preferred, because the resulting MCBs with additive can be dried directly, without any washing, as anions undesirable for catalytic purposes are not present.

The MCBs according to the invention can be prepared in several ways. In general, a microcrystalline boehmite precursor and an additive are combined and converted by aging to a microcrystalline boehmite containing the additive in a homogeneously dispersed state. Aging can be done thermally or hydrothermally. The aging is done in a protic liquid or gas such as water, ethanol, steam, or propanol. Hydrothermal aging means aging under increased pressure for instance, in water in an autoclave at a temperature above 100° C., i.e. under autogeneous pressure. Suitable microcrystalline boehmite precursors are aluminum alkoxides, soluble aluminum salts, thermally treated aluminum trihydrate, aluminum trihidrate such as BOC, Gibbsite and bayerite, amorphous gel alumina, QCBs or MCBs. Examples of suitable preparation processes are described below:

Process 1

The MCB can be prepared by hydrolyzing and aging an aluminum alkoxide in the presence of a compound containing the desired additive(s). The additive can be incorporated during the hydrolysis step or added at the end before the aging step. This general process is known for the preparation of QCBs, but when adapted it is possible to prepare MCBs using this process. To this end the process is either conducted at a temperature above 100° C. and at increased pressure or by subjecting the QCB obtained by hydrolyzation at a temperature below 100° C. to a hydrothermal post-aging treatment.

Process 2

The MCB can be prepared by hydrolysis and precipitation as hydroxides of soluble aluminum salts and aged to form a MCB containing additive. Examples of suitable aluminum salts are aluminum sulphate, aluminum nitrate, aluminum chloride, sodium aluminate, and mixtures thereof. The additive(s) may be added while the hydrolysis and coprecipitation are going on or at the end in the aging step. In order to form MCBs either the aging step must be conducted under hydrothermal condictions, or a hydrothermal post-aging step must be applied.

Process 3

The MCB can also be prepared by aging a slurry containing a thermally treated form of aluminum trihydrate and additive(s) at a temperature above 100° C. at increased pressure, preferably at autogeneous pressure for a time sufficient to form MCBs. Thermally treated forms of aluminum trihydrate are calcined aluminum trihydrate (e.g. Gibbsite or BOC) and flash calcined aluminum trihydrate (CP® alumina). This preparation method has the advantage that no ions are introduced into the MCB apart from any ions present in the additive compound. That means that with the appropriate choice of additive compounds washing steps can be reduced or avoided altogether. For instance, when decomposable anions (such as carbonates, nitrates, and formates) are used, the MCB containing additive can be dried directly, as anions undesirable for catalytic purposes are not present. A further advantage of this preparation method is that it is possible to first shape a slurry containing a thermally treated form of aluminum trihydrate and additive, reslurry the shaped bodies, and subsequently age the shaped bodies to form MCBs. Shaping is defined in this specification as any method of obtaining particles with the appropriate size and strength for the specific purpose. Suitable shaping methods are spray-drying, extrusion, pelletizing extrusion (optionally with intermediate spray-drying, filterpressing and/or kneading), pelletising, beading or any other conventional shaping method used in the catalyst or absorbent field and combinations thereof.

Process 4

The MCB can also be prepared by aging a slurry containing amorphous gel alumina and additive(s) at a temperatures above 100° C. at increased pressure to form MCBs, preferably at autogeneous pressure. Like process 3 mentioned above, this preparation method also has the advantage that no ions are introduced into the MCB apart from the ions of the additive compound. This means that with the appropriate choice of additive compounds washing steps can be reduced or avoided altogether. Also, it is possible to first shape a slurry containing amorphous alumina gel and additive, reslurry the shaped bodies, and subsequently age the shaped bodies to form MCBs.

Process 5

MCBs according to the invention can also be prepared by aging QCB or MCB by thermal or hydrothermal treatment in the presence of compounds of the desired additive to form a MCB containing additive in a homogeneously dispersed state. This process also allows shaping of the QCB or MCB/additive mixture before the (hydro)thermal treatment and formation of MCB containing additive in a homogeneously dispersed state. Further, no ions other than the ions of the additive compound are introduced into the MCB.

Process 6

MCBs can also be prepared by aging alumina trihydrates such as gibbsite, BOC, and bayerite by hydrothermal treatment, optionally with the aid of suitable boehmite seeds in the presence of compounds of the desired additives. Suitable seeds are the known seeds to make microcrystalline boehmite such as commercially available boehmite (Catapal®, Condea® Versal, P-200®, etc), amorphous seeds, milled boehmite seeds, boehmite prepared from sodium aluminate solutions, etc. Also microcrystalline boehmites prepared by one of the processes described here can suitably be used as a seed. Like processes 3, 4, and 5 no ions other than the ions of the additive are introduced into the MCB, and this process allows shaping prior to the aging step.

The first publications on the use of seeds in the hydrothermal conversion of aluminum trihydrate date back in the late 1940's/early 1950's. For example, G. Yamaguchi and K. Sakamato (1959), cleary demonstrate the concept that boehmite seeds substantially improved the kinetics of the hydrothermal conversion of gibbsite to boehmite, by lowering the temperature, shorten the reaction time, and increase the gibbsite conversion.

Also the beneficial principle of seeding with boehmite in the hydrothermal transformation of gibbsite in an autoclave operating at elevated temperatures and autogeneous pressures was also demonstrated clearly by G. Yamaguchi and H. Yamanida (1963).

There are several other publications in the open literature, in which equally well the benefits of seeding with boehmite and/or alkaline solutions are demonstrated. Further, the use of boehmite seed is also claimed to produce finer particle size boehmite product which is easier to disperse in water. The use of boehmite seeds in the hydtrothermal conversion of gibbsite has been described in U.S. Pat. No. 4,797,139, filed on Dec. 16, 1987, and in U.S. Pat. No. 5,194,243, filed on Sep. 30, 1985

In all the above-described processes an intermediate calcination step, prior to the aging step may be applied.

All the processes described above may be conducted batch-wise or in a continuous mode, optionally in a continuous multi-step operation. The process may also be conducted partly batch-wise, partly continuous.

As mentioned above, more than one type of MCB precursor may be used, although care must be taken that the reaction conditions employed enable the conversion of the precursor to MCB. Said mixture of MCB precursors may be prepared before introduction of the additive, or the various types of precursors may be added in any of the further stages of the reaction.

In the processes for the preparation of the MCBs according to the invention more than one aging step may be applied, wherein for instance the aging temperature and/or condition (thermally or hydrothermally, pH, time) is varied.

The reaction products of the processes for the preparation of the MCBs according to the invention may also be recycled to the reactor.

If more than one type of additive is incorporated into the MCB, the various additives may be added simultaneously or sequentially in any of the reaction steps.

It may be advantageous to add acids or bases to adjust the pH during the hydrolysis, precipitation and/or aging steps.

As mentioned above, some of the processes for the preparation of the microcrystalline boehmites according to the invention allow shaping into shaped bodies during preparation. It is also possible to shape the final MCB, optionally with the help of binders and/or fillers. Suitable shaping methods include spray-drying, pelletising, extrusion (optionally with intermediate spray-drying, filterpressing and/or kneading), beading, or any other conventional shaping method used in the catalyst and adsorbent field or combinations thereof.

As mentioned above, the MCBs according to the invention are extremely suitable as components or starting material for catalyst compositions or catalyst additives. To this end the MCB is combined with, optionally, binders, fillers (e.g. clay such as kaolin, titanion oxide zirconia, silica, silica-alumina bentonite, etcetera), catalytically active material such as molecular sieves (e.g. ZSM-5, zeolite Y, USY zeolite), and any other catalyst components such as for instance pore regulating additives, which are commonly used in catalyst compositions. For some applications it may be useful to neutralise the QCB before use as a catalyst component, for instance to improve or create pore volume or other important properties, especially if the QCB has been prepared at low pH. Usually it is preferred to remove any sodium to a content of below 0.1 wt % $Na_2O$. The present invention therefore is also directed to catalyst compositions and catalyst additives comprising the MCB according to the invention.

In a further embodiment of the invention, the MCB may be mixed with other metal oxides or hydroxides, binders, extenders, activators, pore regulating additives etc in the course of further processing to produce absorbents, ceramics, refractories, substrates, and other carriers.

For catalytic purposes, boehmites are generally used at temperatures between 200 and 1300° C. At these high temperatures the boehmites are usually converted into transition-aluminas. Therefore, the present invention is also directed to transition alumina which is obtainable by thermal treatment of the microcrystalline boehmite that contains additive according to the invention, wherein additives are present in a homogeneously dispersed state. The invention is further directed to transition alumina wherein said additives are compounds containing elements selected from the group of alkaline earth metals, transition metals, actinides, silicon, boron, titanium, and phosphorus.

With the above-mentioned transition aluminas catalyst compositions or catalyst additives can be made, optionally with the help of binder materials, fillers, etc.

The present invention will be further illustrated by means of the following non-limiting examples.

EXAMPLES

Comparative Example 1

An XRD spectrum was made of Catapal A®, ex Vista Chemicals, a quasi-crystalline boehmite. See FIG. 1.

Comparative Example 2

An XRD spectrum was made of P200®, ex Condea, a microcrystalline boehmite. See FIG. 2.

Example 3

Catapal® was treated along with 5 wt % (based on the $Al_2O_3$) $La(NO_3)_3$ in solution (calculated as $La_2O_3$) at a pH of 4 for 2 hours at a temperature of 220° C. in an autoclave. FIG. 3 shows the XRD pattern of the MCB formed.

Example 4

Micral 916® Gibbsite was treated with 5 wt % (based on the $Al_2O_3$) $La(NO_3)_3$ in solution (calculated as $La_2O_3$) at a pH of 4 for 2 hours at a temperature of 220° C. in an autoclave Example 4. FIG. 4 shows the XRD pattern of the MCB formed.

Example 5

Micral 916® Gibbsite was treated with 5 wt % (based on the $Al_2O_3$) $La(NO_3)_3$ in solution (calculated as $La_2O_3$) at a pH of 11 for 2 hours at a temperature of 220° C. in an autoclave.

Example 6

Flash calcined Gibbsite was treated with 5 wt % (based on the $Al_2O_3$) $La(NO_3)_3$ in solution (calculated as $La_2O_3$) at a pH of 4 for 2 hours at a temperature of 220° C. in an autoclave. FIG. 5 shows the XRD pattern of the MCB formed.

Example 7

Flash calcined Gibbsite was treated with 5 wt % (based on the $Al_2O_3$) $La(NO_3)_3$ in solution (calculated as $La_2O_3$) at a pH of 11 for 2 hours at temperature of 220° C. in an autoclave.

Example 8

A sample of bayerite was treated at a pH of 4 with 5 wt % (based on the $Al_2O_3$) $La(NO_3)_3$ in solution (calculated as $La_2O_3$) for 2 hours at a temperature of 220° C. in an autoclave. FIG. 6 shows the XRD pattern of the MCB formed.

Example 9

A mixture of Gibbsite, Catapal (ratio 70:30) and 5 wt % (based on the $Al_2O_3$) $La(NO_3)_3$ in solution (calculated as $La_2O_3$) were treated at a pH of 4 for two hours in an autoclave at 220° C. FIG. 7 shows the XRD pattern of the MCB formed.

Example 10

A mixture of Gibbsite, Catapal (ratio 70:30) and 5 wt %(based on the $Al_2O_3$) $La(NO_3)_2$ in solution (calculated as $La_2O_3$) were treated at a pH of 11 for two hours in an autoclave at 220° C.

Example 11

A mixture of Gibbsite, CP alumina (ratio 70:30) and 5 wt % (based on the $Al_2O_3$) $La(NO_3)_3$ in solution (calculated as $La_2O_3$) were treated at a pH of 11 for two hours in an autoclave at 220° C.

Example 12

A mixture of Gibbsite, CP alumina and 5 wt % (based on the $Al_2O_3$) $La(NO_3)_3$ in solution (calculated as $La_2O_3$) were treated at a pH of 4 for two hours in an autoclave at 220° C. FIG. 8 shows the XRD pattern of the MCB formed.

Example 13

P-200® was treated along with 5 wt % (based on the $Al_2O_3$) $La(NO_3)_3$ in solution (calculated as $La_2O_3$) at a pH of 4 for 2 hours at a temperature of 220° C. in an autoclave.

Example 14

CP alumina® was treated along with 5 wt %(based on the $Al_2O_3$) $Ce(NO_3)_3$ in solution (calculated as $Ce_2O_3$ at a pH of 10 for 1 hour at a temperature of 200° C. in an autoclave. FIG. 9 shows the XRD pattern of the MCB formed.

Example 15

CP alumina® was treated along with 5 wt % (based on the $Al_2O_3$) Zinc nitrate in solution (calculated as ZnO) at a pH of 10 for 1 hour at a temperature of 200° C. in an autoclave. FIG. 10 shows the XRD pattern of the MCB formed.

Example 16

CP alumina® was treated along with 5 wt % (based on the $Al_2O_3$) $Ba(NO_3)_2$ in solution (calculated as the oxide) at a pH of 9 for 1 hour at a temperature of 200° C. in an autoclave. FIG. 11 shows the XRD pattern of the MCB formed.

Example 17

BOC was treated along with 5 wt % (based on the $Al_2O_3$) $La(NO_3)_3$ in solution (calculated as $La_2O_3$) at a pH of 4 for 1 hour at a temperature of 220° C. in an autoclave. FIG. 12 shows the XRD pattern of the MCB formed.

Example 18

CP alumina® was treated along with 10 wt % (based on the $Al_2O_3$) $Ga(NO_3)_3$ in solution (calculated as the oxide) at a pH of 6 for 1 hour at a temperature of 200° C. in an autoclave. FIG. 13 shows the XRD pattern of the MCB formed.

Example 19

CP alumina® was treated along with 5 wt % (based on the $Al_2O_3$) sodium silicate in solution (calculated as $SiO_2$) at a pH of 10 for 1 hour at a temperature of 200° C. in an autoclave. FIG. 14 shows the XRD pattern of the MCB formed.

Example 20

Gibbsite and CP alumina® (RATIO 70:30) was treated along with 5 wt % (based on the $Al_2O_3$) $La(NO_3)_3$ in solution (calculated as $La_2O_3$) at a pH of 10 for 1 hour at a temperature of 200° C. in an autoclave. FIG. 15 shows the XRD pattern of the MCB formed.

Example 21

Samples of Catapal®, P-200®, a quasi-crystalline boehmite containing 5 wt % lanthanide in a homogeneously dispersed state and a microcrystalline containing 5 wt % lanthanide in a homogeneously dispersed state were calcined for 8 hours at 1000° C. and at 1200° C. The calcined P-200 sample contained alpha-alumina after calcination at 1000° C., whereas the calcined 5 wt % lanthanide-containing microcrystalline boehmite did not. When comparing the calcined lanthanide-containing quasi-crystalline boehmite with the lanthanide containing microcrystalline boehmite, it was clear that the MCB was thermally more stable than the QCB, because the calcined QCB was converted to alpha-alumina after calcination at 1200° C. with serious loss of surface area whereas the calcined MCB had not converted to alpha-alumina.

What is claimed is:

1. Microcrystalline boehmite wherein an additive is present in a homogeneously dispersed state, which additive is a compound containing an element selected from the group consisting of alkaline earth metals, rare earth metals, alkaline metals, transition metals, actinides, noble metals, silicon, boron, titanium and phosphorus, wherein said additive not containing zirconia or magnesia.

2. A process for the preparation of the microcrystalline boehmite of claim 1 wherein a microcrystalline boehmite precursor and an additive are converted to a microcrystalline boehmite containing an additive in a homogeneously dispersed state.

3. The process of claim 2 wherein the conversion of the microcrystalline boehmite precursor and an additive to the microcrystalline boehmite is effected with an aging step.

4. A process for the preparation of the microcrystalline boehmite of claim 3 wherein the microcrystalline boehmite precursor and the additive are shaped into a shaped body containing a quasi-crystalline boehmite precursor/additive mixture prior to the aging step.

5. The process of claim 3 wherein more than one aging step is used.

6. The process of claim 2 wherein said microcrystalline boehmite precursor is one or more microcrystalline boehmite precursors selected from the group consisting of aluminum alkoxides, soluble aluminum salts, thermally treated aluminum trihydrate, aluminum trihydrate, amorphous gel alumina, QCBs and MCBs.

7. The process of claim 2 wherein the microcrystalline boehmite precursor is aluminum alkoxide and wherein the aluminum alkoxide is hydrolyzed and hydrothermally aged to form microcrystalline boehmite containing additive.

8. The process of claim 2 wherein the microcrystalline boehmite precursor is a soluble aluminum salt and wherein the soluble aluminum salt is hydrolyzed and precipitated as a hydroxide and hydrothermally aged to form a microcrystalline boehmite containing additive.

9. The process of claim 2 wherein the microcrystalline boehmite precursor is thermally treated aluminum trihydrate and wherein the thermally treated aluminum trihydrate is rehydrated in water in the presence of an additive and aged at a temperature above 100° C. for a time sufficient to form microcrystalline boehmite.

10. The process of claim 2 wherein the microcrystalline boehmite precursor is amorphous gel alumina and wherein the amorphous gel alumina is slurried in water in the presence of an additive and the resulting slurry is aged at a temperature above 100° C. for a time sufficient to form microcrystalline boehmite.

11. The process of claim 2 wherein the microcrystalline boehmite precursor is quasi-crystalline boehmite and wherein the quasi-crystalline boehmite is aged by (hydro)thermal treatment in the presence of an additive to form a microcrystalline boehmite containing additive in a homogeneously dispersed state.

12. The process of claim 2 wherein the microcrystalline boehmite precursor is microcrystalline boehmite and wherein the microcrystalline boehmite is aged by (hydro)thermal treatment in the presence of an additive to form a microcrystalline boehmite containing additive in a homogeneously dispersed state.

13. The process of claim 2 wherein the microcrystalline boehmite precursor is aluminum trihydrate and wherein the aluminum trihydrate is aged by hydrothermal treatment in the presence of an additive to form microcrystalline boehmite.

14. The process of claim 2 conducted in a continuous mode.

15. The process of claim 2 wherein the products of the conversion are recycled to the precursor and additive.

16. A shaped particle comprising the microcrystalline boehmite of claim 1.

17. A catalyst composition comprising the microcrystalline boehmite of claim 1.

18. The catalyst composition of claim 17 also containing a binder material.

* * * * *